United States Patent [19]

Smith

[11] Patent Number: 4,709,654

[45] Date of Patent: Dec. 1, 1987

[54] INDICATOR FOR LOOSE LUG NUTS

[76] Inventor: Stanley R. Smith, 8174 Tempest Ridge Way, Parker, Colo. 80134

[21] Appl. No.: 896,729

[22] Filed: Aug. 15, 1986

[51] Int. Cl.⁴ ............................................. G01D 5/00
[52] U.S. Cl. .................................. 116/283; 116/281; 411/548
[58] Field of Search .................. 73/761; 116/208, 212, 116/281, 283; 411/8–14, 548; 33/1 H

[56] References Cited

U.S. PATENT DOCUMENTS

| | | | |
|---|---|---|---|
| 2,738,754 | 3/1956 | Bierer | 116/212 |
| 3,161,174 | 12/1964 | Harrison | 116/212 |
| 3,183,882 | 5/1965 | Preece | 116/DIG. 42 |
| 3,776,031 | 12/1973 | Trigg | 73/761 |
| 3,908,508 | 9/1975 | Payne | 411/12 |
| 3,964,299 | 11/1976 | Johnson | 73/761 |
| 4,041,776 | 8/1977 | Payne | 73/761 |
| 4,058,079 | 11/1977 | Taylor et al. | 116/283 |
| 4,073,212 | 2/1978 | Lerich | 411/9 |
| 4,217,849 | 8/1980 | Brown et al. | 116/212 |
| 4,626,121 | 12/1986 | Tajima et al. | 403/27 |

Primary Examiner—Allan N. Shoap
Assistant Examiner—W. Morris Worth
Attorney, Agent, or Firm—W. Scott Carson

[57] ABSTRACT

A device for indicating when a lug nut has come loose on an automobile wheel. In one embodiment, the device operates by detecting relative movement between the lug nut and the axle stud on which it is mounted. In a second embodiment, the detected relative movement is between the lug nut and the wheel itself. In the preferred embodiment, the device has a first member with an open-ended channel and second and third members slideably received in it. The second member operates in cooperation with the sides of the channel and one of the springs to hold the third member in a retracted or cocked position when the lug nut is in its preferred, tight position against the wheel. Thereafter, should the lug nut come loose and move relative to the stud, the second member will follow or move under the force of its spring outwardly to maintain contact with the free end of the stud. In doing so, the third or indicator member is released to move in the opposite direction under the force of its spring to protrude beyond the outer surface of the lug nut where it can be easily and quickly seen or felt by hand. In the second embodiment, the second or follower member abuts the wheel itself rather than the free end of the stud but otherwise operates in the same manner.

13 Claims, 7 Drawing Figures

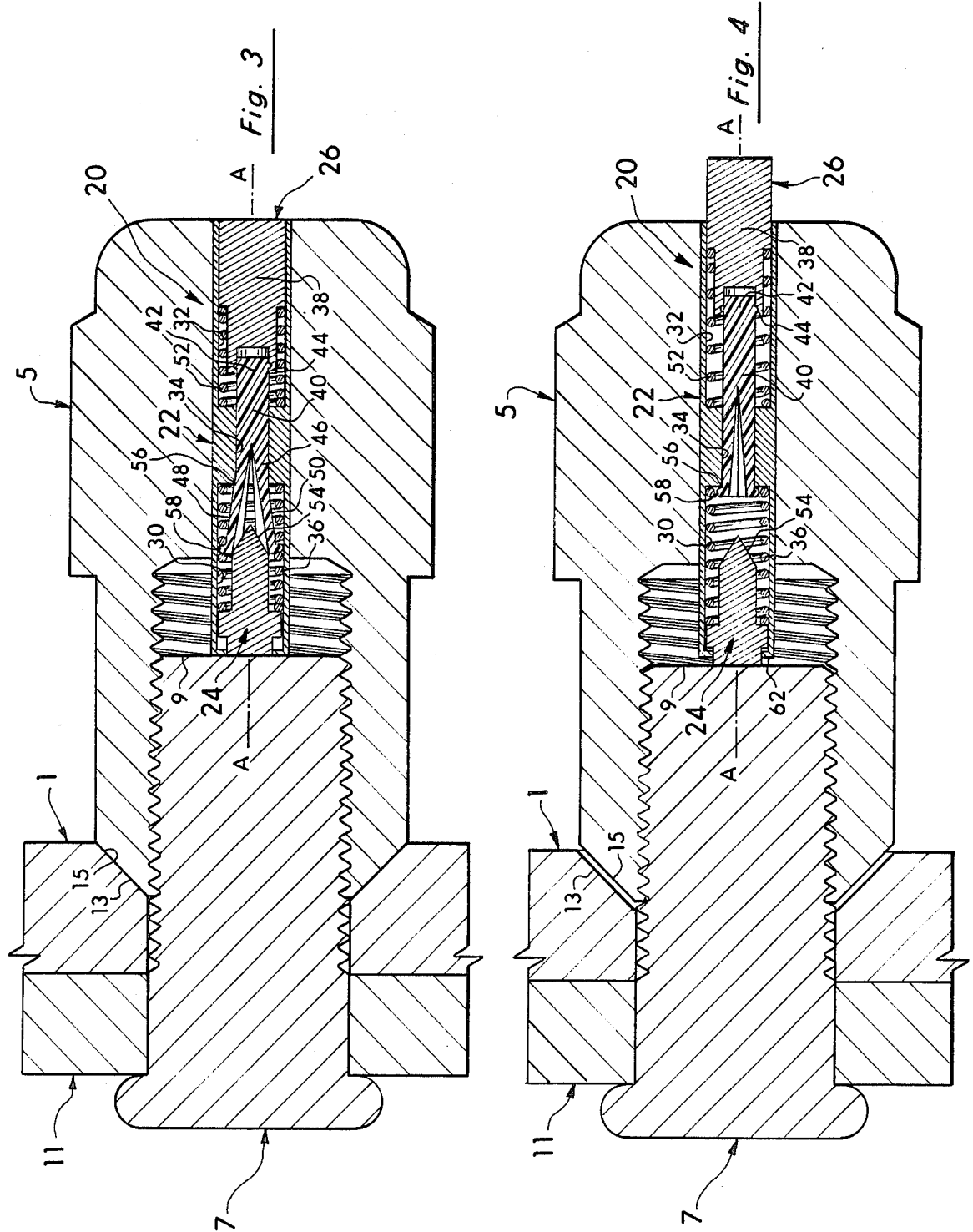

INDICATOR FOR LOOSE LUG NUTS

BACKGROUND OF THE INVENTION

1. Field of the Invention

This invention relates to the field of devices for indicating relative movement between two objects and more specifically to the field of devices for indicating when a lug nut has come loose on an automobile wheel.

2. Background Discussion

Lug nuts are almost universally used to secure wheels to the axles of cars. In the most common case, each of the car axles has a plurality of threaded studs on it wherein the car tires are first mounted on wheels and each wheel then secured to the axle studs by lug nuts. Like the studs, the lug nuts are threaded and in operation, they are tightened to a flush position against each wheel.

In use, the problem can subsequently arise that one or more of the lug nuts may become loose and a wheel begin to wobble. If the loose nut is not discovered and re-tightened, the wobbling can become worse. This can then distend or distort the stud hole in the wheel to the point that the wheel is ruined. Additionally, it can cause the other lug nuts to come loose and in extreme cases, the wheel may even fall off.

Presently, it is virtually impossible to tell just by looking at the lug nuts whether one or more of them are beginning to come loose. Further, it is equally difficult to manually inspect them for looseness without a torque wrench or other tool because although the nuts may be coming loose and have moved away from their tight position, they may still feel tight at least to the touch. That is, the nuts only need to move a very small amount (e.g., 1/16 of a turn or about 0.005 inches away from the wheel) to be loose enough that it may become dangerous. With such a small amount, most if not all people cannot detect any difference either visually or by simply touching the nuts. In the extreme situation, it is usually easy to tell when a nut has come completely off but by then the damage may have already been done. For example, in cars with wheel covers, a lug nut that has come completely off can usually be heard clanking around inside the cover as the car moves. Similarly, in cars with exposed wheels such as mag wheels, it is fairly easy to tell by visual inspection when a lug nut has come completely off. However, in both cases, once the nut has come completely off, it is usually too late since severe damage has often already occurred. Consequently, to prevent such damage and the accompanying unsafe conditions, it is necessary to be able to easily and quickly detect the initial movement of even the slightest amount by the lug nut away from its tight position particularly since once the nut begins to come loose, it is only a very short time before it becomes so loose as to be dangerous.

With this in mind, the present invention was developed. With the present invention, lug nuts can be quickly and easily inspected to determine if they have become loose and moved even the smallest amount away from their tight positions. Further, in the preferred embodiment of the invention, this inspection can be done visually by simply looking at the lug nuts or manually by simply running ones fingers over the outer surfaces of the lug nuts. Additionally, once a loose condition has been detected, the lug nut can be easily and quickly re-tightened with the indicator device of the present invention also being easily and quickly re-set at the same time.

SUMMARY OF THE INVENTION

This invention involves a device for indicating when a lug nut has come loose on an automobile wheel. In one embodiment, the device operates by detecting relative movement between the lug nut and the axle stud on which it is mounted. This, in turn, indicates that the nut has moved away from its tight position and become loose. In a second embodiment, the detected relative movement is between the lug nut and the wheel itself. In the preferred embodiment, the device has a first member that has a channel in it. The channel is open-ended and has second and third members slideably received in it. The second and third members are each spring biased away from each other and respectively toward one of the open ends of the channel. The second member operates in cooperation with the sides of the channel and one of the springs to hold the third member in a retracted or cocked position when the lug nut is in its preferred, tight position against the wheel. In this position, the second or follower member abuts the stud and is also held in a retracted or cocked position. Thereafter, should the lug nut come loose and move relative to the stud, the second member will follow or move under the force of its spring outwardly to maintain its contact with the free end of the stud. In doing so, the third or indicator member is released to move in the opposite direction under the force of its spring. A portion of the third member then protrudes beyond the outer surface of the lug nut and can be easily and quickly seen or felt by hand. Upon seeing or feeling the protruding third member, the operator then knows that the lug nut has come loose and moved away from its tight position. In the second embodiment, the second or follower member abuts the wheel itself rather than the free end of the stud but otherwise operates in the same manner.

BRIEF DESCRIPTION OF THE DRAWINGS

FIG. 3 is an enlarged view of the device of the present invention showing the relative positioning of its members when the lug nut is in its preferred, tight position against the wheel.

FIG. 4 is a view similar to FIG. 3 showing the relative positioning of the members of the devce when the lug nut has come loose. In this position, the second or follower member has moved to the left and this motion has released the third or indicator member to pop out beyond the crown of the lug nut where it can be easily seen or felt.

DETAILED DESCRIPTION OF THE PREFERRED EMBODIMENTS

Figure 1:
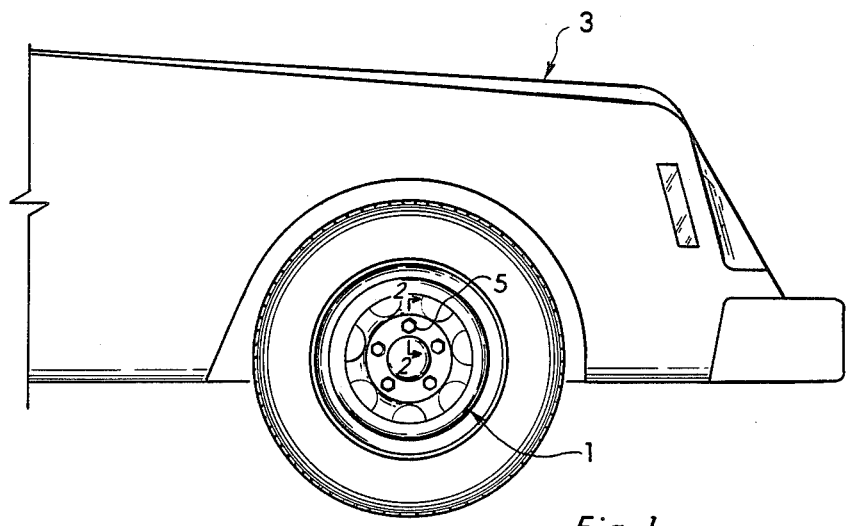
FIG. 1 is a view of the front end of a car showing a typical arrangement of lug nuts on a mag wheel.

As illustrated in FIG. 1, automobile wheels such 1 are almost universally secured to cars such as 3 by lug nuts 5. The lug nuts are commonly either of the mag-type variety (member 5 in FIGS. 1–5) or the open-ended type 5' in FIG. 7. The primary difference being that the mag-type nuts 5 (see FIG. 2) cover the free end 9 of the axle stud 7 while the more conventional, open-ended nuts 5' in FIG. 7 leave the free end 9 of the stud 7 exposed.

Figure 2:
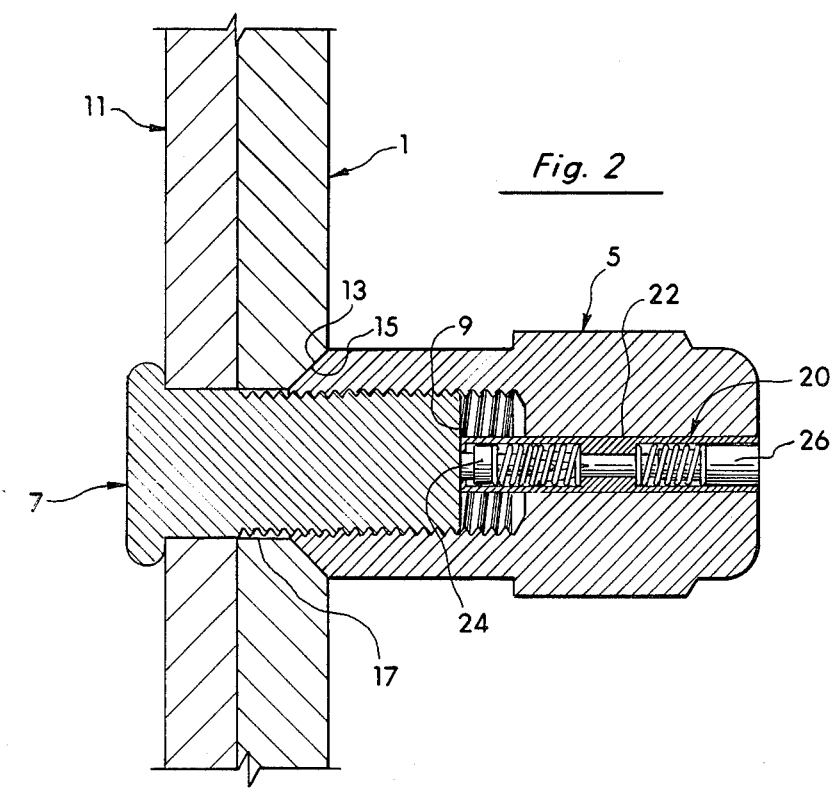
FIG. 2 is a cross-sectional view taken along line 2—2 of FIG. 1.

Referring to FIG. 2, the lug nut 5 serves to securely hold the wheel 1 on the car axle 11. In doing so, the lug nut 5 is screwed onto the threaded stud 7 until the chamfered surfaces 13 and 15 on the wheel 1 and lug nut 5 are flush and tight against one another usually under a force of, for example, 15 pounds. This is commonly accomplished by using a torque wrench, air drill, tire iron, or similar tool. Once set in the preferred, tight position of FIG. 2, the wheel 1 and axle 11 will then operate in a safe and efficient manner. However, the problem can subsequently arise that the lug nut 5 will work itself loose during extended operation of the car 3 and the wheel 1 will begin to wobble. Unless this loose condition is discovered and the lug nut 5 re-tightened, the condition will worsen to the extent that the stud hole 17 (see FIG. 2) in the wheel 1 will be distended or distorted to the point that the wheel 1 is ruined. Additionally, it can cause other lug nuts 5 to come loose and in the extreme case, the wheel 1 may even fall off.

A lug nut such as 5 in FIG. 2 does not have to move very far at all from its tight position of FIG. 2 in order to be loose enough to begin to cause damage and present an unsafe condition. Also, although it may take a long time for a lug nut 5 to initially become loose and move away from its tight position, it may take very little time thereafter for the condition to worsen to the point that the lug nut 5 has come completely off the stud 7 and the wheel 1 has been severelly damaged. In this light, it is highly desirable to be able to easily and quickly detect when a lug nut 5 has initially come loose and moved away from its tight position (e.g., moved 1/16 of a turn or about 0.005 inches away from the wheel 1) and it is with this in mind that the present invention was developed.

With the present invention, even the slightest amount of movement between the lug nut 5 and wheel 1 (see FIGS. 3 and 4) can be detected. In doing so, the indicator 20 of the present invention employs a first or channel member 22 (see FIG. 3), a second or follower member 24, and a third or indicator member 26. The channel member 22 has a channel in it extending along the axis A—A in FIG. 3. The channel is open-ended and has first and second chambers 30 and 32 in it separated by a smaller, interconnecting passageway 34. The second or follower member 24 is dimensioned to be slideably received in chamber 30 for movement along the axis A—A between a retracted or cocked position (FIG. 3) and an extended or uncocked position (FIG. 4). The second or follower member 24 is substantially T-shaped and is biased under the force of coil spring 36 to the left in FIG. 3 or away from its cocked position. As illustrated in FIG. 3 and 4, the follower member 24 abuts against the free end 9 of the stud 7 and when the lug nut 5 comes loose and moves away from the wheel 1 (see FIG. 4), the second member 24 will follow or move under the force of the spring 36 outwardly of the channel member 22 (compare FIGS. 3 and 4) to maintain its contact with the free end 9 of the stud 7.

Figure 6:
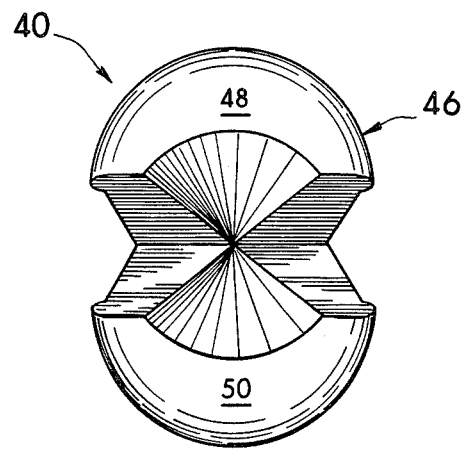
FIG. 6 is an end view of the hollowed out end of the third or indicator member which receives and is wedged outwardly by the second or follower member.

The third or indicator member 26 of the present device is actually made up of two parts 38 and 40 that are press-fit together. The first part 38 (see FIG. 3) is substantially T-shaped and the second part 40 is an elongated member whose one end at 42 is press-fit into the end 44 of the first part 38. The other end 46 of the second part 40 is cut and hollowed out (see FIG. 6) to form two flexible, free-standing sections 48 and 50. The indicator member 26 (which is composed of parts 38 and 40) is dimensioned to be slideably received in the chambers 30 and 32 as well as the interconnecting passageway 34 of the channel member 22. In this manner, the indicator member 26 can be moved along the axis A—A between a retracted or cocked position (FIG. 3) and an extended or uncocked position (FIG. 4). Like the follower member 24, the indicator member 26 is biased under the force of a coil spring 52 away from its cocked position or to the right in FIG. 3. In this manner and in the retracted or cocked positions of FIG. 3, the follower member 24 and indicator member 26 are biased in opposite directions away from each other and toward their respective extended or uncocked positions of FIG. 4.

In the cocked position of FIG. 3, the pointed, male end 54 of the follower member 24 is received in the hollowed out, female end 46 of the indicator member 26. In doing so as best seen in FIG. 3, the two flexible, free-standing sections 48 and 50 of the indicator member 26 are wedged apart and against the wall of the channel member 22 substantially at the location 56 where the chamber 30 and interconnecting passageway 34 meet. This, in turn, holds the indicator member 26 in its retracted or cocked position of FIG. 3 against the force of the coil spring 52. Alternately or in addition, this holding can be accomplished by wedging the sections 48 and 50 outwardly so that the lip portion 58 of the indicator means 26 (see FIG. 3) is wedged against the wall of the channel member 22 or a section of the lip portion 58 abuts and is held in place by a coil of the spring 36 as shown in FIG. 3.

Figure 5:
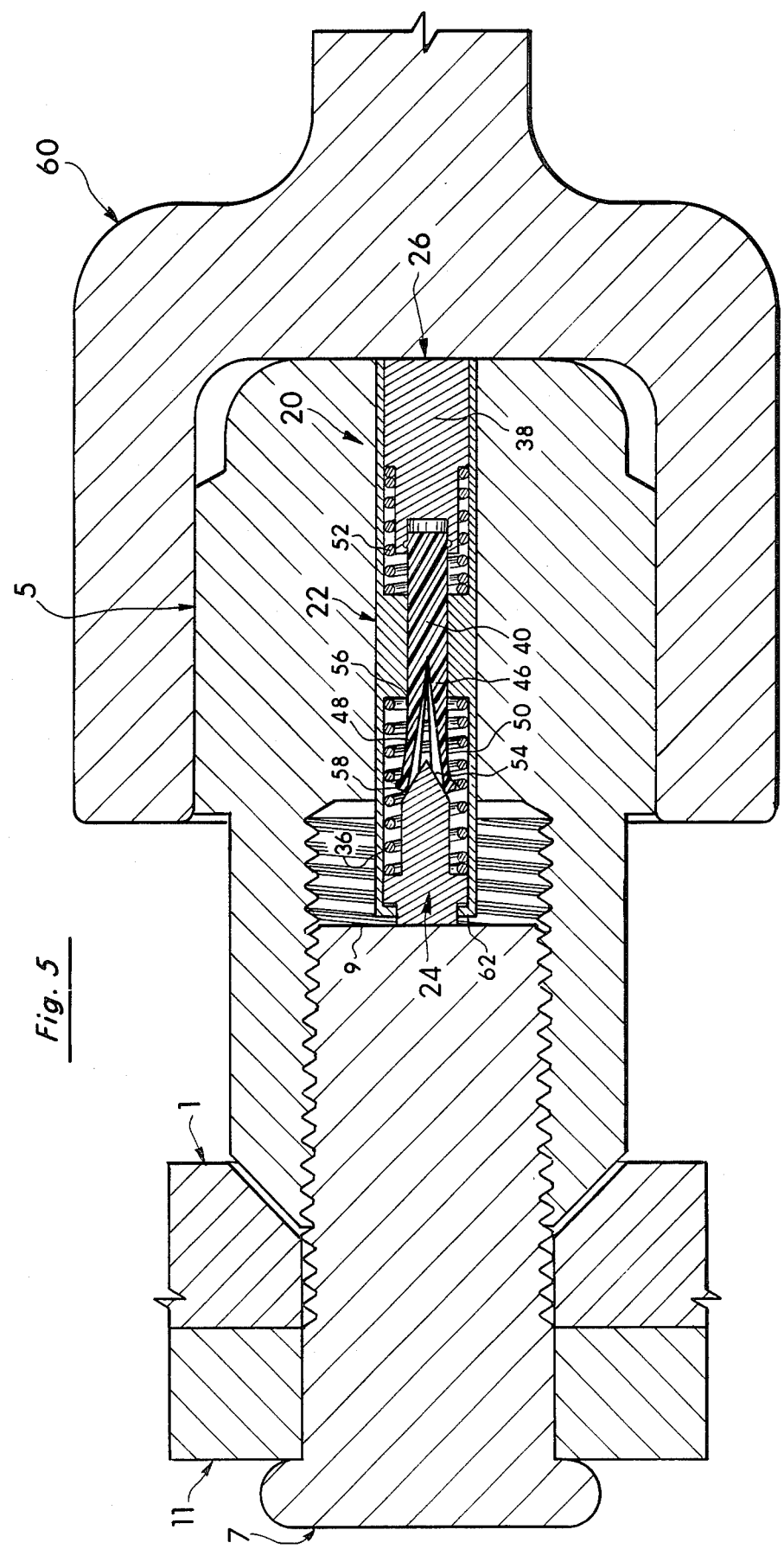
FIG. 5 illustrates the manner in which the third or indicator member can be held in its depressed or cocked position by a tire iron as the lug nut is being tightened.

In operation and in order to cock the device 20 of the present invention, the indicator member 26 (see FIG. 4) is first moved to the left against the force of its biasing spring 52 by, for example, a tire iron such as 60 in FIG. 5. In the position of FIG. 5, the lug nut 5 is then tightened with the indicator member 26 depressed in its cocked position until the follower member 24 abuts against the free end 9 of the stud 7 (see FIG. 5). Thereafter, continued tightening of the lug nut 5 with the free end 9 of the stud 7 abutting the follower member 24 will cause the follower member 24 to move to the right against the biasing force of its spring 36 (compare FIGS. 3 and 5). In doing so, the male end 54 of the depressed or retracted follower member 24 will be received in the female end 46 of the indicator member 26 and the flexible sections 48 and 50 of the indicator member 26 will be wedged apart. In this position (FIG. 3), the holding mechanism of the male end 54 of the follower member 24, the female end 46 of the indicator member 26, and the wedging at 56 of the sections 48 and 50 against the wall of the channel member 22 serves to hold or maintain the indicator member 26 in its retracted or cocked position of FIG. 3 even when the tire iron 60 is removed. Additionally or in the alternative, the holding mechanism can also include the wedging of the lip portion 58 of the indicator member 26 against the wall of the channel member 22 or the catching of the lip portion 58 on a coil of the spring 36 (see FIG. 3).

As long as the lug nut 5 remains in its tight position against the wheel 1 (FIG. 3), the indicator member 26 remains in its retracted or cocked position. However, should the lug nut come loose and move even the slightest amount (e.g., 1/16 of a turn or about 0.005 inches away from the wheel one—greatly exaggerated in FIG. 4), the member 24 will follow or move to the left in FIGS. 3 and 4 under the force of the biasing spring 36 to maintain its contact with the free end 9 of the stud 7. This movement and the structure that accomplishes it serves to release the indicator member 26 to move under the force of its biasing spring 52 to its extended or uncocked position of FIG. 4. An observer can then easily detect by merely visually inspecting the lug nut 5 or running his fingers over it that the indicator member 26 has popped out to its extended or uncocked position and, consequently, that the lug nut 5 has come loose. The extent to which the indicator member 26 pops out of the lug nut 5 can be varied and is determined by how far the end 46 of the indicator member 26 extends into the chamber 30. That is, the indicator member 26 will pop out the throw distance between FIG. 3 and when the lip portion 58 (see FIG. 4) on the indicator member 26 abuts against the end of the passageway 34 at 56.

To assemble the device 20 of the present invention, the part 40 of the indicator member 26 can be moved into the channel member 22 from left to right in FIG. 4. At the same time and with the biasing spring 52 in place about the shaft of the T-shaped part 38, the part 38 of the indicator member 26 is moved into the channel member 22 from right to left in FIG. 4. The two parts 38 and 40 are then snapped or press-fit together at 42 and 44 to form a unitary piece. The spring 36 and follower member 24 can then be inserted into the channel member 22 from left to right in FIG. 4 and the open end of the channel member 22 crimped or coined at 62 to maintain the follower member 24 in the channel member 22. The channel member 22 is then secured in the lug nut 5 and the device 20 is ready for operation. Alternatively and if desired, the channel with chambers 30 and 32 and interconnecting passageway 34 could be formed directly in the lug nut 5. However, in the embodiments of FIGS. 1-7, the channel member 22 is preferably separate from the lug nuts 5 and 5'.

Figure 7:
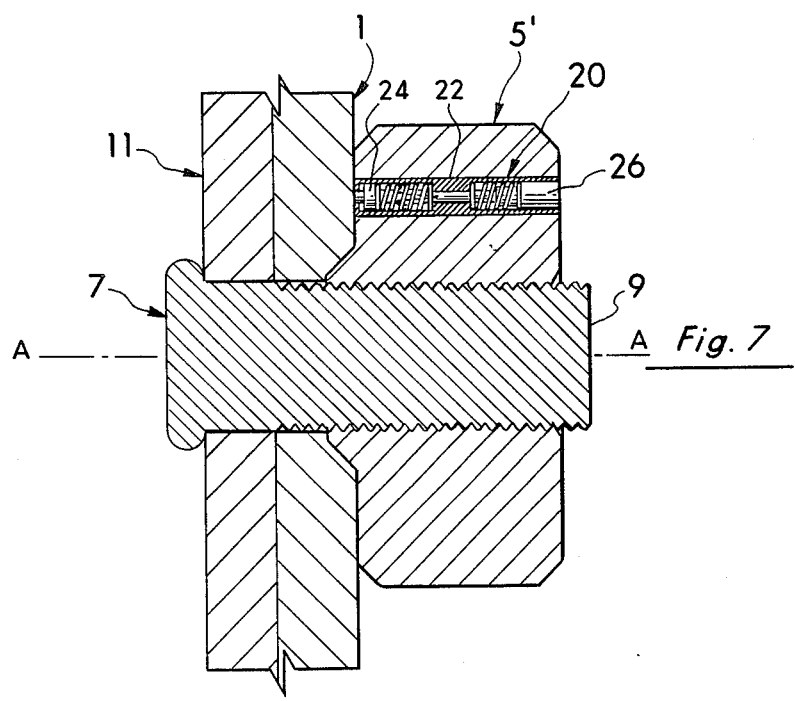
FIG. 7 is a view similar to FIG. 2 in which the device of the present invention is adapted for use with a conventional, open-ended lug nut. In this embodiment, the second or follower member abuts the wheel itself rather than the free end of the stud as in the first embodiment of FIGS. 1-6.

In the second embodiment of FIG. 7, the device 20 of the present invention has been adapted for use with a conventional, open-ended lug nut 5'. In doing so, the channel member 22 is positioned off-set from the axis A—A and the follower member 24 abuts against the wheel 1 rather than against the free end 9 of the stud 7 as in the preferred embodiment of FIGS. 1-6. As in the preferred embodiment, the movement of the indicator member 26 to its extended position then serves to indicate that the lug nut 5' has come loose. This can be preferably done either by visual or manual inspection but it is also contemplated that the movement of the indicator member 26 in either embodiment could be sensed and used, for example, to set off an alarm or to activate a remote monitor.

While several embodiments of the present invention have been shown and described in detail, it is to be understood that various modifications could be made to these embodiments without departing from the scope of the invention.

I claim:

1. A device primarily intended for use as an indicator that an object such as a lug nut has come loose and moved away from a preferred tight position relative to another object such as a stud on an automobile axle, said device including:

a channel member having a channel therein extending along an axis, a follower member dimensioned to be slideably received in said channel for movement relative to said channel member between a cocked position and an uncocked position, an indicator member dimensioned to be slideably received in said channel for movement relative to said channel member between a cocked position and an uncocked position, first means for biasing said follower member in a first direction toward its uncocked position, second means for biasing said indicator member in a direction substantially opposite said first direction and toward its uncocked position, said follower member and said indicator member being farther apart from each other when in the respective uncocked positions than in the respective cocked positions and said follower member abutting against one of said objects and being moved against the force of the first biasing means to its cocked position when the objects are moved together into the preferred tight position, said device further includes means for holding said indicator member in its cocked position against the force of the second biasing means when said follower member is in its cocked position and means for releasing said indicator member to move to its uncocked position under the force of the second biasing means when said follower member is moved under the force of the first biasing means away from its cocked position in response to said objects moving away from the preferred tight position whereby the indicator member is held in its cocked position when the two objects are in the preferred tight position and the indicator member is moved under the force of the second biasing means to its uncocked position when the two objects move apart, the movement of the indicator member to its uncocked position serving to indicate that the two objects have moved relative to each other away from the preferred tight position, and said channel in said channel member has two chambers spaced from each other along said axis with a passageway interconnecting the two chambers, said passageway being smaller than either chamber wherein at least a portion of said follower member is slideably received in one of said chambers as said follower member moves between its cocked and uncocked positions, at least a portion of said indicator member is slideably received in the other chamber as said indicator member moves between its cocked and uncocked position, and only a portion of one of said follower and indicator members is slideably received at any one time in said interconnecting passageway as said follower and indicator members move between their cocked and uncocked positions.

2. The device of claim 1 wherein said holding means includes a portion of said follower member.

3. The device of claim 1 wherein said holding means includes a portion of said indicator member.

4. The device of claim 1 wherein said channel member has a wall that defines said channel and the holding means includes means for wedging said portion of said indicator member outwardly against said channel wall to hold said indicator member in its cocked position.

5. A device primarily intended for use as an indicator that an object such as a lug nut has come loose and moved away from a preferred tight position relative to another object such as a stud on an automobile axle, said device including:

a channel member having a channel therein extending along an axis, a follower member dimensioned to be slideably received in said channel for movement relative to said channel member between a cocked position and an uncocked position, an indicator member dimensioned to be slideably received in said channel for movement relative to said channel member between a cocked position and an uncocked position, first means for biasing said follower member in a first direction toward its uncocked position, second means for biasing said indicator member in a direction substantially opposite said first direction and toward its uncocked position, said follower member and said indicator member being farther apart from each other when in the respective uncocked positions than in the respective cocked positions and said follower member abutting against one of said objects and being moved against the force of the first biasing means to its cocked position when the objects are moved together into the preferred tight position, said device further includes means for holding said indicator member in its cocked position against the force of the second biasing means when said follower member is in its cocked position and means for releasing said indicator member to move to its uncocked position under the force of the second biasing means when said follower member is moved under the force of the first biasing means away from its cocked position in response to said objects moving away from the preferred tight position whereby the indicator member is held in its cocked position when the two objects are in the preferred tight position and the indicator member is moved under the force of the second biasing means to its uncocked position when the two objects move apart, the movement of the indicator member to its uncocked position serving to indicate that the two objects have moved relative to each other away from the preferred tight position, and said holding means further includes a portion of one of said indicator and follower members and said channel member has a wall that defines said channel and the holding means includes means for wedging said portion outwardly against said channel wall to hold said indicator member in its cocked position wherein the portion of one of said indicator and follower members includes at least two flexible, free standing sections and said wedging means wedges said two flexible sections outwardly apart from one another from a first position spaced from said channel wall to a second position abutting against said channel wall.

6. The device of claim 5 wherein said portion is part of said indicator member and said wedging means is a portion of said follower member.

7. The device of claim 4 wherein said wedging means is a portion of said follower member.

8. The device of claim 1 wherein said holding means includes substantially mating, male and female portions on said follower and indicator members.

9. The device of claim 1 wherein said only portion is part of said indicator member.

10. The device of claim 1 wherein said only portion is always received in said interconnecting passageway as said follower and indicator members move between their cocked and uncocked positions.

11. A device primarily intended for use as an indicator that an object such as a lug nut has come loose and moved away from a preferred tight position relative to another object such as a stud on an automobile axle, said device including:

a channel member having a channel therein extending along an axis, a follower member dimensioned to be slideably received in said channel for movement relative to said channel member between a cocked position and an uncocked position, an indicator member dimensioned to be slideably received in said channel for movement relative to said channel member between a cocked position and an uncocked position, first means for biasing said follower member in a first direction toward its uncocked position, second means for biasing said indicator member in a direction substantially opposite said first direction and toward its uncocked position, said follower member and said indicator member being farther apart from each other when in the respective uncocked positions than in the respective cocked positions and said follower member abutting against one of said objects and being moved against the force of the first biasing means to its cocked position when the objects are moved together into the preferred tight position, said device further includes means for holding said indicator member in its cocked position against the force of the second biasing means when said follower member is in its cocked position and means for releasing said indicator member to move to its uncocked position under the force of the second biasing means when said follower member is moved under the force of the first biasing means away from its cocked position in response to said objects moving away from the preferred tight position whereby the indicator member is held in its cocked position when the two objects are in the preferred tight position and the indicator member is moved under the force of the second biasing means to its uncocked position when the two objects move apart, the movement of the indicator member to its uncocked position serving to indicate that the two objects have moved relative to each other away from the preferred tight position, and;

said holding means includes said first biasing means, said indicator member includes a lip portion and said holding means includes means for wedging said lip portion outwardly to engage said first biasing means to hold said indicator member in its cocked position.

12. A device primarily intended for use as an indicator that an object such as a lug nut has come loose and moved away from a preferred tight position relative to another object such as a stud on an automobile axle, said device including:
- a channel member having a channel therein extending along an axis,
- a follower member dimensioned to be slideably received in said channel for movement relative to said channel member between a cocked position and an uncocked position,
- an indicator member dimensioned to be slideably received in said channel for movement relative to said channel member between a cocked position and an uncocked position,
- first means for biasing said follower member in a first direction toward its uncocked position,
- second means for biasing said indicator member in a direction substantially opposite said first direction and toward its uncocked position, said follower member and said indicator member being farther apart from each other when in the respective uncocked positions than in the respective cocked positions and said follower member abutting against one of said objects and being moved against the force of the first biasing means to its cocked position when the objects are moved together into the preferred tight position,
- said device further includes means for holding said indicator member in its cocked position against the force of the second biasing means when said follower member is in its cocked position and means for releasing said indicator member to move to its uncocked position under the force of the second biasing means when said follower member is moved under the force of the first biasing means away from its cocked position in response to said objects moving away from the preferred tight position whereby the indicator member is held in its cocked position when the two objects are in the preferred tight position and the indicator member is moved under the force of the second biasing means to its uncocked position when the two objects move apart, the movement of the indicator member to its uncocked position serving to indicate that the two objects have moved relative to each other away from the preferred tight position, and
- both of said follower and indicator members are substantially T-shaped and each of said first and second biasing means is a coil spring extending about the shaft of the respective T-shaped, follower and indicator members.

13. The device of claim 11 wherein said first biasing means is a coil spring.

* * * * *